United States Patent [19]

Okawa et al.

[11] Patent Number: 5,547,784
[45] Date of Patent: Aug. 20, 1996

[54] ALKALINE STORAGE BATTERY AND METHOD FOR PRODUCING THE SAME

[75] Inventors: Takashi Okawa, Fujisawa; Masashi Enokido, Chigasaki; Shingo Tsuda, Fujisawa; Norikatsu Akutsu, Tokyo, all of Japan

[73] Assignee: Matsushita Electric Industrial Co., Ltd., Osaka, Japan

[21] Appl. No.: 348,085

[22] Filed: Nov. 25, 1994

Related U.S. Application Data

[63] Continuation-in-part of Ser. No. 175,507, Dec. 30, 1993, abandoned.

[30] Foreign Application Priority Data

Jan. 18, 1993 [JP] Japan .................................. 5-005591

[51] Int. Cl.$^6$ .............................. H01M 4/26; H01M 4/28; H01M 4/48; H01M 4/38
[52] U.S. Cl. .......................... 429/218; 29/623.5; 429/59; 429/223; 429/224; 420/900
[58] Field of Search ..................... 429/223, 224, 429/218, 59, 206, 232; 420/900; 29/623.5

[56] References Cited

U.S. PATENT DOCUMENTS

| | | | |
|---|---|---|---|
| Re. 34,471 | 12/1993 | Kameoka et al. | 29/623.5 X |
| 4,623,597 | 11/1986 | Sapru et al. . | |
| 4,925,748 | 5/1990 | Ikoma et al. | 429/206 X |
| 5,008,164 | 4/1991 | Furukawa et al. | 429/59 |
| 5,077,149 | 12/1991 | Ikoma et al. | 429/101 |
| 5,242,656 | 9/1993 | Zhang et al. | 420/417 |
| 5,242,766 | 9/1993 | Furukawa | 429/206 X |
| 5,277,998 | 1/1994 | Furukawa et al. | 429/59 |
| 5,278,001 | 1/1994 | Ono et al. | 429/218 |
| 5,284,619 | 2/1994 | Hazama | 420/900 |
| 5,304,345 | 3/1994 | Fujitani et al. | 420/455 |
| 5,376,474 | 12/1994 | Tadokoro et al. | 420/900 |
| 5,384,209 | 1/1995 | Bouet et al. | 429/59 |
| 5,384,214 | 1/1995 | Sugihara et al. | 429/206 |
| 5,389,468 | 2/1995 | Fujiwara et al. | 429/59 |

FOREIGN PATENT DOCUMENTS 62211862  9/1987  Japan .

OTHER PUBLICATIONS

*Concise Chemical and Technical Dictionary*, pp. 788–789 and cover page, Chemical Publishing Co., Inc., 1962.

Primary Examiner—Stephen Kalaput
Assistant Examiner—Carol Chaney
Attorney, Agent, or Firm—Watson Cole Stevens Davis, P.L.L.C.

[57] ABSTRACT

An alkaline storage battery made using a hydrogen-storing alloy for the negative electrode has suffered from the problems that the negative electrode is oxidized with oxygen gas generated from the positive electrode during overdischarge to cause increase of internal resistance and deterioration of charging and discharging cycle characteristics. Disclosed is a solution to the above problems which incorporates into the hydrogen-storing alloy negative electrode one of yttrium and yttrium compounds or a mixture thereof in such a state that it covers the surface of the hydrogen-storing alloy powder.

11 Claims, 1 Drawing Sheet

ALKALINE STORAGE BATTERY AND METHOD FOR PRODUCING THE SAME

This application is a Continuation-In-Part of U.S. patent application Ser. No. 08/175 507, filed on Dec. 30, 1993, now abandoned, incorporated herein by reference.

BACKGROUND OF THE INVENTION

1. Field of the Invention

The present invention relates to an alkaline storage battery which has a hydrogen-storing negative electrode mainly composed of a hydrogen-storing alloy powder capable of reversibly occluding and releasing hydrogen, and a positive electrode mainly composed of a metal oxide, and a method for producing the battery.

2. Description of Related Art

It is proposed in JP-62-211862A that the utilization of active material in charging and discharging in nickel-cadmium storage batteries can be improved by adding a small amount of yttrium oxide to a powder, mainly composed of cadmium oxide, constituting the negative electrode. However, this patent publication does not disclose the use of yttrium oxide in a hydrogen-storing alloy negative electrode. This patent publication merely shows enhancing the capacity of a battery by improving the utilization of a cadmium negative electrode.

It has further been proposed to add rare metals as an alloy component to a hydrogen-storing alloy negative electrode, but it is not disclosed to inhibit oxidation of the hydrogen-storing alloy by the addition of rare metals. U.S. Pat. No. 5,304,345 to Fujitani et al proposes using yttrium as one of the constituents of hydrogen-storing alloys. This patent does not disclose preparing a negative electrode from a hydrogen-storing alloy powder by adding yttrium or a yttrium compound to the powder.

On the other hand, alkaline storage batteries having a hydrogen-storing electrode as a negative electrode have recently been noted as batteries providing a higher energy density and being pollution-free as compared with conventional secondary batteries such as nickel-cadmium batteries and lead acid batteries.

Such alkaline storage batteries, in which a hydrogen-storing electrode is used as a negative electrode, undergo oxidation of the hydrogen-storing alloy powder which constitutes the negative electrode after repetition of charging and discharging cycles. As a result, the performance of the batteries deteriorates. Usually, the oxygen gas generated from a positive electrode during the overcharging cycle accelerates the oxidation of the hydrogen-storing alloy. Consequently, the charge acceptance of the hydrogen-storing alloy decreases and the hydrogen pressure increases during charging to bring about an increase of internal cell pressure and actuation of a safety valve. Thus, electrolyte is lost and internal resistance of the batteries increases to result in reduction of discharge capacity of the battery after subjected to charging and discharging cycles.

In order to inhibit the oxidation of the hydrogen-storing alloy powder, a method has been proposed to make a negative electrode using a hydrogen-storing alloy powder coated with carbonaceous materials or to coat the surface of the powder with a metal such as copper or nickel by plating or vapor deposition.

Use of the above negative electrode comprising a hydrogen-storing alloy powder which is coated with carbonaceous materials, copper or nickel improves oxidation resistance of the electrode per se and restrains oxidation of the hydrogen-storing alloy powder and, as a result, prolongs the life of the electrode.

However, according to the method of coating the surface of the powder with carbonaceous materials, copper or nickel, cracks occur in the powder of the hydrogen-storing alloy, after repetition of charging and discharging, to produce a fresh active surface. This fresh active surface is oxidized so that the hydrogen-storing ability of the hydrogen-storing alloy decreases. Thus, the method is not satisfactory for restraining the oxidation.

SUMMARY OF THE INVENTION

The main object of the present invention is to improve the charge and discharge cycle characteristics of batteries by inhibiting oxidation of a negative electrode without complicating the production steps of electrodes or batteries and without increasing the production cost of the batteries.

DETAILED DESCRIPTION OF PREFERRED EMBODIMENTS

Figure 1:
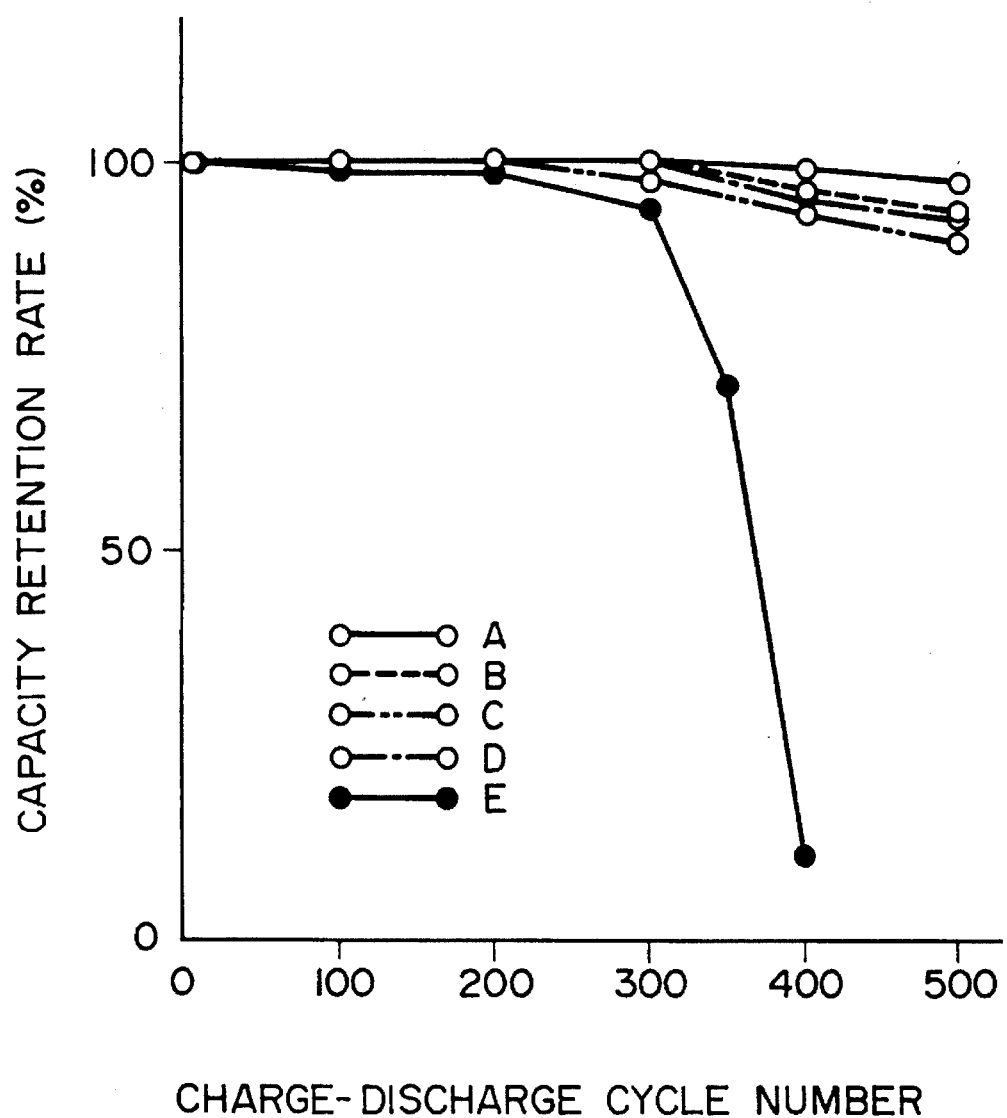
FIG. 1 is a graph showing the charge-discharge cycle characteristics of the present invention.

The alkaline storage battery of the present invention comprises a positive electrode mainly composed of a metal oxide, a negative electrode mainly composed of a hydrogen-storing alloy powder, a separator and an alkaline electrolyte, characterized in that the negative electrode comprises the hydrogen-storing alloy powder and any one of Y, $Y_2O_3$, $Y(OH)_3$ and $Y_2(SO_4)_3$ or a mixture thereof.

Any one of Y, $Y_2O_3$, $Y(OH)_3$ and $Y_2(SO_4)_3$ or a mixture thereof contained in the negative electrode is added by coating on the surface of the hydrogen-storing alloy powder or by incorporating into the hydrogen-storing alloy negative electrode.

The mechanism of the action of yttrium in the hydrogen-storing alloy negative electrode is not clear, but yttrium ions have the effect of inhibiting the oxidation of the hydrogen-storing alloy.

This may probably occur because the yttrium ions are precipitated as $Y(OH)_3$ on the surface of the hydrogen-storing alloy powder and this $Y(OH)_3$ protects the surface of the alloy powder from oxygen generated at the positive electrode when overcharged.

Accordingly, the surface of the hydrogen-storing alloy powder is covered with $Y(OH)_3$ by coating the surface of the hydrogen-storing alloy powder with any one of Y, $Y_2O_3$, $Y(OH)_3$ and $Y_2(SO_4)_3$ or a mixture thereof or by adding any one of Y, $Y_2O_3$, $Y(OH)_3$ and $Y_2(SO_4)_3$ or a mixture thereof to a paste used for preparation of the negative electrode. As a result, the oxidation of the negative electrode at the time of overcharging is inhibited.

That is, Y is converted to $Y(OH)_3$ by charging and discharging, $Y_2O_3$ is converted to $Y(OH)_3$ by hydration, and $Y_2(SO_4)_3$ is converted to $Y(OH)_3$ by neutralization. Thus, $Y(OH)_3$, whether applied as $Y(OH)_3$ or formed from another material which is converted to $Y(OH)_3$, covers the surface of the alloy to inhibit the oxidation of the alloy.

Furthermore, even when cracks occur in the hydrogen-storing alloy powder, due to the repetition of charging and discharging, and fresh active surfaces are produced, $Y(OH)_3$ dissolved in the alkaline solution in reprecipitated on the fresh active surfaces and covers the surface of the powder. Consequently, oxidation of the negative electrode can be inhibited. This prevents increase of the internal cell pressure and increase of the internal resistance of the battery. Also, cycle characteristics as a battery are improved.

The amount of Y, $Y_2O_3$, $Y(OH)_3$, $Y_2(SO_4)_3$ or a mixture thereof contained in the negative electrode is preferably 0.1–10% by weight based on the hydrogen-storing alloy powder. When the amount is less than 0.1% by weight, the effect to improve the charging and discharging cycle characteristics is lost. When it is more than 10% by weight, the amount of the hydrogen-storing alloy powder per unit volume of the negative electrode decreases and a large capacity cannot be obtained.

The following examples will illustrate the present invention.

EXAMPLE 1

Commercially available Mm (Misch metal: a mixture of rare-earth elements having a composition of 31% La, 48 wt % Ce, 15 wt % Nd, 5 wt % Pr and 1% others), Ni, Co, Al and Mn were weighted at a given ratio and mixed. The mixture was heated and made molten by an arc melting method to prepare a hydrogen-storing alloy for a negative electrode which had a $CaCu_5$ type crystal structure and an alloy composition of $MmNi_{3.55}Co_{0.75}Al_{0.3}Mn_{0.4}$.

The resulting alloy was crushed by a ball mill to an average particle size of about 20 μm. To this alloy was added $Y_2O_3$ having an average particle size of 1.5 μm in an amount of 1 part by weight based on 100 parts of the hydrogen-storing alloy powders.

Furthermore, a 1 wt % aqueous carboxymethylcellulose solution was added thereto to prepare a paste. This paste was filled into an electrically conductive substrate comprising a foamed nickel porous body of about 95% in porosity. This was dried and pressed to a given thickness to make a hydrogen-storing alloy electrode.

A coiled element was fabricated using the above electrode as a negative electrode, a known foamed metal type nickel positive electrode of 1000 mAh in capacity and a separator of a sulfonated polypropylene nonwoven fabric. This element was inserted in a metallic case and filled with an aqueous potassium hydroxide solution as an electrolyte of 7.2 mol/l in concentration. Then, the case was sealed to obtain a battery of AA size of this Example 1.

EXAMPLE 2

A 1 wt % aqueous carboxymethylcellulose solution was added to the hydrogen-storing alloy powder prepared in Example 1 to obtain a paste. This paste was filled into a foamed nickel porous body of about 95% in porosity. This was dried and pressed to a given thickness to make a hydrogen-storing alloy electrode. This hydrogen-storing alloy electrode was immersed in an aqueous yttrium sulfate solution of 1 mol/l for about 1 minute and then dried at 100° C. for 30 minutes in an inert gas atmosphere. Thereafter, the electrode was immersed in an aqueous potassium hydroxide solution of 2 mol/l for about 2 minutes, washed with water and dried to obtain an electrode in which the surface of the alloy was covered with $Y(OH)_3$.

A sealed alkaline storage battery was prepared in the same manner as in Example 1 except that the above obtained electrode was used as a negative electrode.

EXAMPLE 3

The hydrogen-storing alloy powder prepared in Example 1 was immersed in an aqueous yttrium sulfate solution of 1 mol/l for about 1 minute and then dried at 100° C. for 30 minutes in an inert gas atmosphere. Thereafter, the powder was immersed in an aqueous potassium hydroxide solution of 2 mol/l for about 2 minutes, washed with water and dried to obtain a hydrogen-storing alloy powder covered with $Y(OH)_3$.

A 1 wt % aqueous carboxymethylcellulose solution was added to the hydrogen-storing alloy powder to obtain a paste. This paste was filled into a foamed nickel porous body of about 95% in porosity. This was dried and pressed to a given thickness to make a hydrogen-storing alloy electrode.

A sealed alkaline storage battery was prepared in the same manner as in Example 1 except that the above obtained electrode was used as a negative electrode.

EXAMPLE 4

The hydrogen-storing alloy powder prepared in Example 1 was immersed in an aqueous yttrium nitrate solution of 1 mol/l for about 1 minute and then subjected to thermal decomposition at 500° C. under vacuum to obtain a hydrogen-storing alloy powder covered with a yttrium oxide on the surface thereof. A 1 wt % aqueous carboxymethylcellulose solution was added to the resulting hydrogen-storing alloy powder to prepare a paste. This paste was filled into a foamed nickel porous body of about 95% in porosity. This was dried and pressed to a given thickness to make a hydrogen-storing alloy electrode.

A sealed alkaline storage battery was prepared in the same manner as in Example 1 except that the above obtained electrode was used as a negative electrode.

Comparative Example

For comparison, a hydrogen-storing alloy negative electrode containing neither yttrium nor yttrium compound was prepared using the hydrogen-storing alloy prepared in Example 1 and a comparative sealed alkaline storage battery was prepared in the same manner as in Example 1 except that the above obtained negative electrode was used.

Each of the above batteries was subjected to the following charging and discharging cycle test.

The battery was subjected to repetition of a cycle which consists of charging with a current corresponding to ⅓ C. for 4.5 hours at 20° C. and full discharging with a current corresponding to 1 C, and change in capacity with the cycle number was evaluated.

FIG. 1 is a graph which shows the relation between the cycle number and the capacity retention rate when the capacity after the 1st cycle is assumed to be 100.

In FIG. 1, A, B, C, D and E show the batteries of Examples 1, 2, 3 and 4 and the Comparative Example, respectively.

As is clear from FIG. 1, the batteries A, B, C and D prepared using the hydrogen-storing alloy negative electrode containing yttrium or a yttrium compound according to the present invention were remarkably improved in charging and discharging cycle characteristics as compared with the battery E of the Comparative Example prepared using the hydrogen-storing alloy negative electrode in which neither yttrium nor the yttrium compound was present.

In the present invention, yttrium in the form of an ion is dissolved in an electrolyte and is reprecipitated in the form of $Y(OH)_3$ on the surface of the alloy. As a result, oxidation of the hydrogen-storing alloy powder is inhibited and the cycle life of a battery employing such powder can be improved.

In Example 1, $Y_2O_3$ was used as a yttrium oxide added to the negative electrode, but the same effect can be obtained by using Y, $Y(OH)_3$ and $Y_2(SO_4)_3$ each alone or in admixture.

In the above Examples, the hydrogen-storing alloy negative electrodes were prepared by filling a foamed nickel porous body with a paste comprising a hydrogen-storing alloy powder. Alternatively, the negative electrode may be prepared by coating the paste onto a punched metal.

Furthermore, in the above Examples, yttrium sulfate was used as the yttrium salt, but the same effect can be obtained by using yttrium salts such as yttrium chloride and yttrium nitrate, since use of any of these salts results in a yttrium oxide or hydroxide covering the surface of the hydrogen-storing alloy powder.

Moreover, the thermal decomposition was carried out under vacuum in the above Examples, but the same effect can be obtained when it is carried out in an inert atmosphere or a reducing atmosphere.

As explained above, according to the present invention, alkaline storage batteries having excellent charging and discharging cycle characteristics can be obtained by adding to or containing in a hydrogen-storing alloy negative electrode one of Y, $Y_2O_3$, $Y(OH)_3$ and $Y_2(SO_4)_3$ or a mixture thereof.

What is claimed:

1. An alkaline storage battery which comprises a positive electrode mainly composed of a metal oxide, a negative electrode mainly composed of a hydrogen-storing alloy powder, a separator and an alkaline electrolyte, wherein said negative electrode comprises the hydrogen-storing alloy powder and any yttrium-containing material selected from the group of Y, $Y_2O_3$, $Y(OH)_3$ and $Y_2(SO_4)_3$ or a mixture thereof.

2. An alkaline storage battery according to claim 1, wherein the negative electrode further comprises a conductive substrate, the material and the hydrogen-storing alloy powder are contained in a paste coated on the conductive substrate of the negative electrode.

3. An alkaline storage battery according to claim 1, wherein the material covers the surface of the hydrogen-storing alloy.

4. An alkaline storage battery according to claim 2, wherein the material covers the surface of the alloy.

5. An alkaline storage battery according to claim 2, wherein the paste contains the alloy powder and particles of the material.

6. An alkaline storage battery according to claim 1, wherein the negative electrode further comprises a conductive substrate and the material and the hydrogen-storing alloy powder are contained in a paste located in the conductive substrate of the negative electrode.

7. An alkaline storage battery according to claim 6, wherein the material covers the surface of the alloy.

8. An alkaline storage battery according to claim 6, wherein the paste contains the alloy powder and particles comprising the material.

9. A method of producing an alkaline storage battery, comprising coating or filling of a conductive substrate with a paste comprising a hydrogen-storing alloy powder to form a negative electrode, and subjecting the negative electrode to the sequential steps of immersing in an yttrium salt-containing solution, drying, immersing in an aqueous alkali solution, washing with water and drying.

10. A method of producing an alkaline storage battery, comprising making a negative electrode by subjecting a hydrogen-storing alloy powder to the sequential steps of immersing in a yttrium salt-containing solution, drying, immersing in an aqueous alkali solution, washing with water and drying, preparing a paste of the thus subjected hydrogen-storing alloy powder, and coating or filling a conductive substrate with the paste.

11. A method of producing an alkaline storage battery, comprising the steps of immersing a hydrogen-storing alloy powder in an yttrium salt-containing solution where the salt coats the powder and then thermally decomposing the salt, making a paste from the decomposed salt-covered hydrogen alloy powder and coating or filling a conducting substrate with the paste.

* * * * *